United States Patent
Lee

(10) Patent No.: US 6,198,925 B1
(45) Date of Patent: Mar. 6, 2001

(54) METHOD AND APPARATUS FOR INTELLIGENT MICROCELL AND ANTENNA SELECTION IN DIGITAL CELLULAR TELEPHONE SYSTEMS

(75) Inventor: William C. Y. Lee, Danville, CA (US)

(73) Assignee: Cellco Partnership, Bedminster, NJ (US)

( * ) Notice: Subject to any disclaimer, the term of this patent is extended or adjusted under 35 U.S.C. 154(b) by 0 days.

(21) Appl. No.: 08/914,428

(22) Filed: Aug. 19, 1997

Related U.S. Application Data

(60) Provisional application No. 60/024,950, filed on Aug. 30, 1996.

(51) Int. Cl.[7] ............... H04J 11/00; H04Q 7/20; H01Q 3/24; H01Q 3/22
(52) U.S. Cl. ............. 455/434; 370/206; 342/373; 342/383
(58) Field of Search .................... 455/434, 436, 455/449, 562; 370/332, 343, 347, 206; 342/383

(56) References Cited

U.S. PATENT DOCUMENTS

| | | |
|---|---|---|
| 4,128,740 | 12/1978 | Graziano . |
| 4,525,861 | 6/1985 | Freeburg . |
| 4,704,734 | 11/1987 | Menich et al. . |
| 4,797,947 | 1/1989 | Labedz . |
| 4,901,307 | 2/1990 | Gilhousen et al. . |
| 4,932,049 | 6/1990 | Lee . |
| 5,056,109 | 10/1991 | Gilhousen et al. . |
| 5,067,147 | 11/1991 | Lee . |
| 5,101,501 | 3/1992 | Gilhousen et al. . |
| 5,109,390 | 4/1992 | Gilhousen . |
| 5,193,109 | 3/1993 | Lee . |
| 5,243,598 | 9/1993 | Lee . |
| 5,479,397 | 12/1995 | Lee . |
| 5,504,936 | 4/1996 | Lee . |
| 5,754,138 | * 5/1998 | Turcotte et al. ............ 342/373 |
| 5,812,522 | * 9/1998 | Lee et al. ................. 370/206 |
| 5,917,447 | * 6/1999 | Wang et al. ............... 342/383 |

FOREIGN PATENT DOCUMENTS

| | | |
|---|---|---|
| 0329997 | 3/1989 | (EP) . |
| 0364190 | 9/1989 | (EP) . |

OTHER PUBLICATIONS

Vucetic & Kline, "Signal Monitoring System for Wireless Network Operation and Manahement", Telecommunications Synposium 1998, IT '98 Procwwdings, SBT/IEEE International, Aug. 9, 1998.*

William C. Y. Lee –Sonet Update: From Promise to Reality; *Getting Down to the Nitty–Gritty of CDMA*, May 1, 1991, pp. 72–77.

Jan–Erik Stjernvall –Nordic Seminar on Digital Land Mobile Radiocommunication –*Calculation of Capacity and Co–Channel Interference in a Cellular System*, 5–7 Feb. 1985, Espoo, Finland, 8 pp.

* cited by examiner

*Primary Examiner*—William Cumming
(74) *Attorney, Agent, or Firm*—Gates & Cooper

(57) ABSTRACT

A method and apparatus for apparatus for controlling communications between a mobile cellular telephone and a cell of a cellular telephone network. The apparatus comprises a serving transceiver for transmitting and receiving communications between the cell and the mobile cellular telephone, a scanner, coupled to an antenna, for selectably scanning the communication channels to measure a characteristic of the signal transmitted from the mobile telephone, and a controller, coupled to the scanner and the serving transceiver, for commanding the antenna based on the measured signal characteristic.

6 Claims, 8 Drawing Sheets

METHOD AND APPARATUS FOR INTELLIGENT MICROCELL AND ANTENNA SELECTION IN DIGITAL CELLULAR TELEPHONE SYSTEMS

CROSS REFERENCE TO RELATED APPLICATIONS

This application claims the benefit under 35 U.S.C. § 119(e) of U.S. Provisional application Ser. No. 60/024,950, filed Aug. 30, 1996, entitled "INTELLIGENT MICROCELL AND ANTENNA SELECTION IN CDMA CELLULAR TELEPHONE SYSTEMS" by William C. Y. Lee which application is incorporated by reference herein.

This application is also related to application Ser. No. 08/608,172, filed Feb. 28, 1996, entitled "DIGITAL MICROCELLS FOR CELLULAR NETWORKS," by William C. Y. Lee, now U.S. Pat. No. 5,678,186, which is a continuation of application Ser. No. 08/263,129, filed Jun. 21, 1994, now U.S. Pat. No. 5,504,936, which is a continuation of ser. No. 08/330,200, filed Oct. 27, 1994, now U.S. Pat. No. 5,479,397, which is a continuation of application Ser. No. 08/052,636, filed Apr. 26, 1993, now abandoned, which is a continuation-in-part of application Ser. No. 07/679,521, filed Apr. 2, 1991, now U.S. Pat. No. 5,243,598, all of which applications are incorporated by reference herein.

BACKGROUND OF THE INVENTION

1. Field of the Invention

This invention relates in general to methods and devices for cellular telephone communications, and in particular to a method and apparatus for intelligent microcell and antenna selection in cellular telephone systems.

2. Description of Related Art

Cellular telephone communications technologies has advanced rapidly in the last decade. A key advance in the development of cellular telephone communications is the advent of digital microcells, as described in U.S. Pat. Nos. 4,932,049 and 5,504,936, issued to Lee, both of which are hereby incorporated by reference herein. These patents describe the use of a plurality of contiguous cells, each cell with a master site and a plurality of zone sites defining communication zones, which are defined by a plurality of suitably positioned antenna sets within the periphery of the cell. Consequently, each zone has a transmitting and receiving means directionally configured to limit propagation of signals substantially to a zone within the boundaries of the cell.

The performance of cellular telephone systems, i.e., voice quality, coverage, and capacity, has been improved through the use of both intelligent microcells and beamswitching or beam-forming antennae defining communications zones. This may be accomplished by measuring the strength of the signal transmitted by the mobile telephone in each communication zone, and use of that measurement to determine the location of the mobile cellular telephone. Thereafter, transmissions to that mobile cellular telephone are accomplished by selecting the antennae transmitting into the same communication zone that the mobile cellular telephone is located in. By substantially limiting transmissions into this particular communication zone, interference in other zones is minimized and capacity is increased.

Another major improvement in mobile cellular telephone technology involves the application of code division multiple access (CDMA) communication technologies. CDMA is a method wherein each user's transmissions are modulated by a different pseudo-random (PN) code to distinguish the user's logical channel, instead of being assigned a different frequency channel or a different time slot. These PN codes are orthogonal or partially correlated to each other, so that it is possible to identify the user channel based on an analysis of the PN codes used in the transmission. As a result, more than one user can use the same frequency, so long as they each use different PN codes to modulate their transmissions.

CDMA is especially desirable if the communication channel is relatively noisy. This is because CDMA typically uses spread spectrum techniques that are tolerant to noise and multipath interference. As a result, CDMA allows more users to use more noisy frequency channels to make calls, thereby increasing the capacity of the cellular telephone system.

Another advantage of CDMA is that every cell uses the same set of wideband frequencies or channels. As a result, it is possible to have the closest co-channel separation, i.e., the ratio of the co-channel separation distance (D) and the cell radius (R) in a CDMA system could be equal to 2, whereas the ratio D/R for other communication methods is about 4.6.

A consequence of using the same set of wideband frequencies in every cell is that no frequency switching is required as mobile units move from cell to cell. Instead, as mobile units move from cell to cell, only the PN codes need to change. Such changes in the PN codes, instead of frequency, are referred to as "soft" hand-offs. As a result, there is an improvement in the performance of the cellular telephone system.

While intelligent microcell and adaptive antenna switching technologies have been successful, they do not take full advantage of the benefits offered by microcell cellular telephone technology. For example, the foregoing increases capacity and reduces noise and cost by modifying the transmission of signals from the cell to the mobile cellular telephone to reduce interference, but does nothing to reduce received noise from other extraneous sources that are not under the cellular telephone network's control. There is therefore a need in the art for improved methods to reduce these noise sources.

Further, intelligent microcells and beam-switching antennae have not been successful CDMA cellular telephone systems. A primary reason for this is that the PN code for each user is not detected at the RF (radio frequency) stage in order to determine the associated signal strength. As a result, the proper microcell zone or antenna beam cannot be selected by the signal strength. Thus, there is also a need in the art for microcell and antenna selection in CDMA cellular telephone systems.

SUMMARY OF THE INVENTION

To overcome the limitations in the prior art described above, and to overcome other limitations that will become apparent upon reading and understanding the present specification, the present invention discloses an apparatus for controlling communications between a mobile cellular telephone and a cell of a cellular telephone network. The apparatus comprises a serving transceiver for transmitting and receiving communications between the cell and the mobile cellular telephone, a scanner, coupled to an antenna, for selectably scanning the communication channels to measure a characteristic of the signal transmitted from the mobile telephone, and a controller, coupled to the scanner and the serving transceiver, for commanding the antenna based on the measured signal characteristic.

In one embodiment, antenna control is provided by a switching network which selects an antenna or combination of antennae for communications. In another embodiment, this is accomplished via beam forming techniques. The present invention is suitable for both GSM and CDMA coded communications.

BRIEF DESCRIPTION OF THE DRAWINGS

Referring now to the drawings in which like reference numbers represent corresponding elements throughout.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

Figure 1:
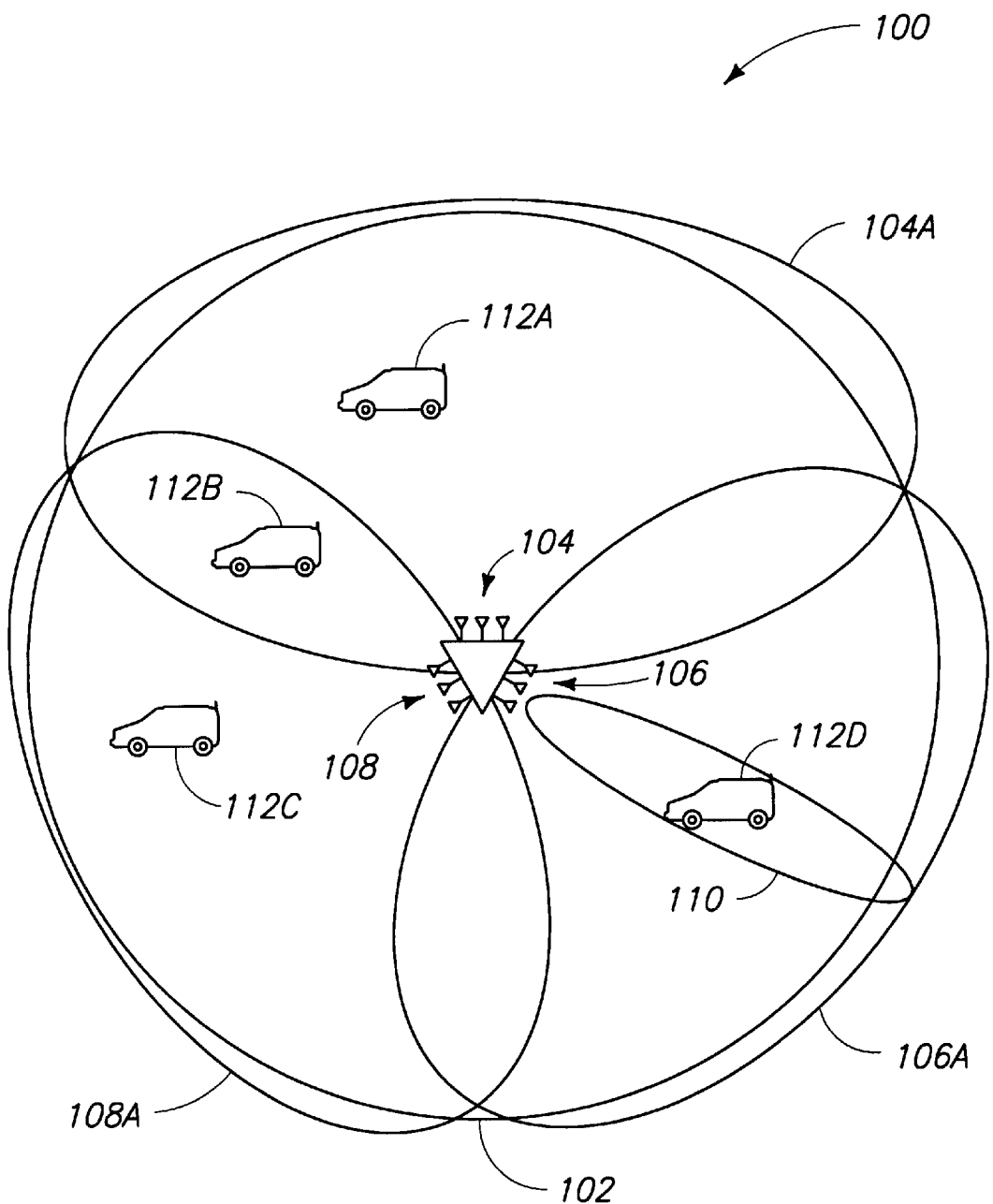
FIG. 1 is a diagram presenting an overview of the environment of the present invention.

FIG. 1 is a diagram presenting an overview of the present invention. A cellular telephone network 100 comprises a plurality of cellular telephone cells 102, which are serviced by one or more antennae 104, 106, and 108. By virtue of the transmission and/or reception characteristics of the antennae 104, 106, and 108, communication zones 104A, 106A, and 108A are defined within the cell 102. These zones may be defined by the reception characteristics of the antennae 104, 106, and 108, and associated equipment, the transmission characteristics of the antennae 104, 106, and 108 and the associated equipment, or both. In general, the boundaries of the communication zones 104A, 106A, and 108A will also be determined from other variables such as surrounding terrain, and interference from other signal sources. In one embodiment of the present invention, the scope of communication zones 104A, 106A, and 108A can also be determined by the reception capability and characteristics of the mobile cellular telephone 112, which can be obtained by measurement or by message transmission from the mobile cellular telephone 112.

Antennae 104, 106, and 108 can comprise a simple single antenna for transmitting and receiving communications from the mobile cellular telephone 112, or can comprise separate antennas for transmission and reception of the communications. Further, the antennae 104, 106, and 108 may comprise a phased array, or other multiple antenna constructs, including beam forming antennae, which allow the antenna sensitive axis and other parameters such as beamwidth or gain to be physically or electronically commanded or controlled, thereby defining a beam forming antenna area 110 to service mobile units 112D in the cell 102.

Although not shown in FIG. 1, the cellular telephone network 100 also comprises other cells similarly described. Mobile telephone 112 may be in one or more communication zones 104A, 106A, and 108A of the cell 102 at any one time. For example, as mobile telephone travels within the cell 102, it may be initially found in communication zone 104A, as indicated by its position at 112A, subsequently located in communication zones 104A and 108A, as indicated by its position at 112B, or in another single communication zone 108A, as indicated by position 112C.

Figure 2:
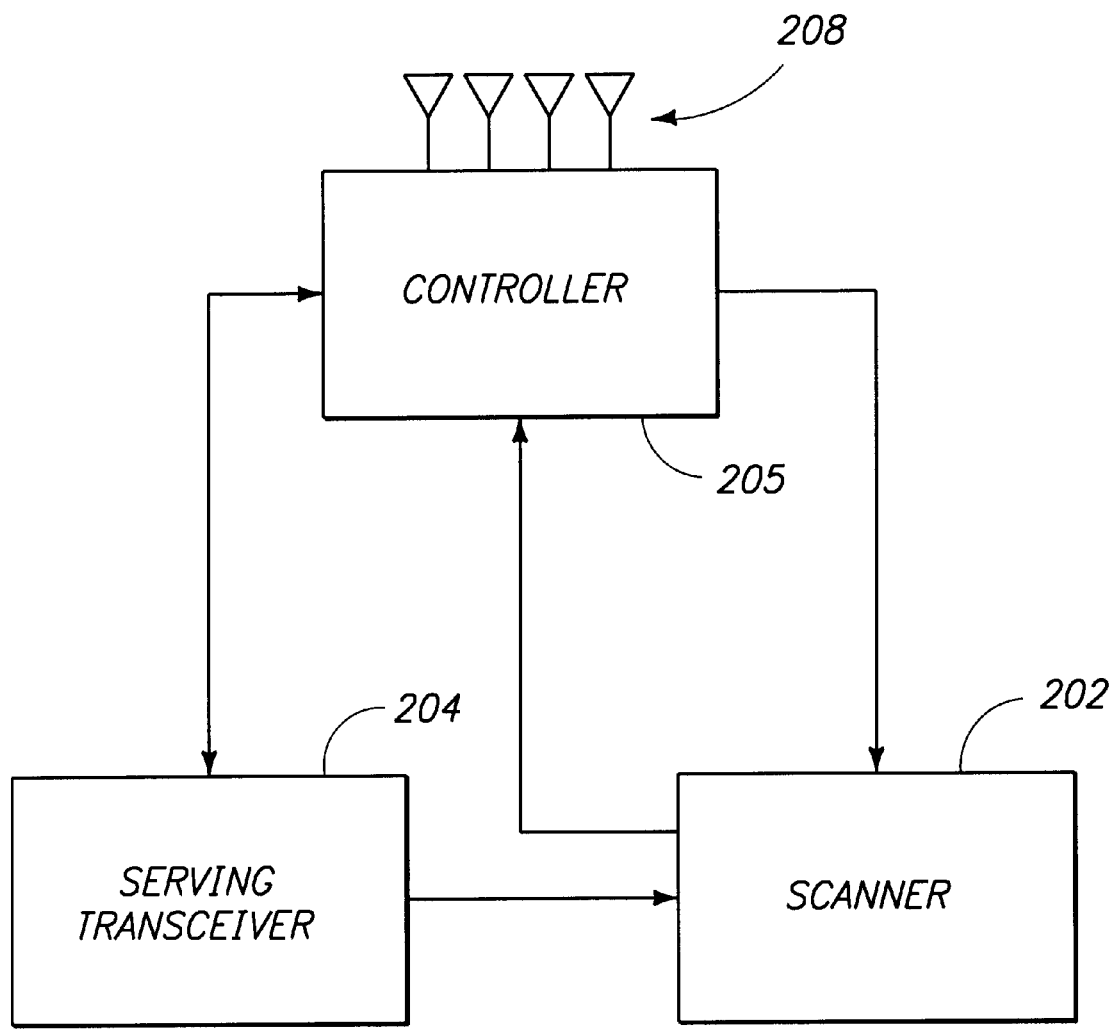
FIG. 2 is a top-level block diagram of the present invention.

FIG. 2 is a top-level block diagram of the present invention. The antennae described with respect to FIG. 1 are collectively represented as antennae 208 in this diagram. The present invention comprises a controller 205 coupled to the antennae 208, a scanner 202, and a serving transceiver 204. The serving transceiver 204 supports transmission and reception of communications between the cell 102 and the mobile cellular telephone 112, and to support this function, is coupled to the antennae 208 via the controller 205.

The scanner 202, selectably scans communication channels to measure a characteristic of signals transmitted from the mobile cellular telephone 112. This may be accomplished by using the antennae 208 servicing the zone where the measurement is taken, however, this may be accomplished by using antennae 208 from other zones, more than one zone, or alone or in combination with beam forming techniques such as those employed with phased array antennae.

The controller 205 uses the measured characteristic and other relevant information to command the antenna for communications with the mobile cellular telephone 112. In one embodiment, these antenna commands use beam forming techniques to direct and control the antenna for communications with the mobile telephone 112. In another embodiment, this is accomplished by merely switching antennae 104, 106 and 108 to select a communications zone. In a third embodiment, this is accomplished with both switching and beam forming techniques.

The antennae 104, 106, and 108 may also be controlled based upon other information regarding the mobile cellular telephone 112 or its user. For example, the signal characteristic measured from the mobile cellular telephone user may indicate that the user is in communication zone 104A and communication zone 108A, indicating that either can be selected for communications. If the mobile cellular telephone 112 was located at 112A and communications zone 104A was used for communications in the recent past, location at position 112C may indicate that the user will enter and remain in communications zone 108A. This information can be used to more intelligently select the communications zone. Further, historical data regarding each particular user or user group travel patterns, road patterns, or combinations thereof can be used with or without optimal filtering or prediction techniques to control antennae 104, 106, and 108.

Figure 3:
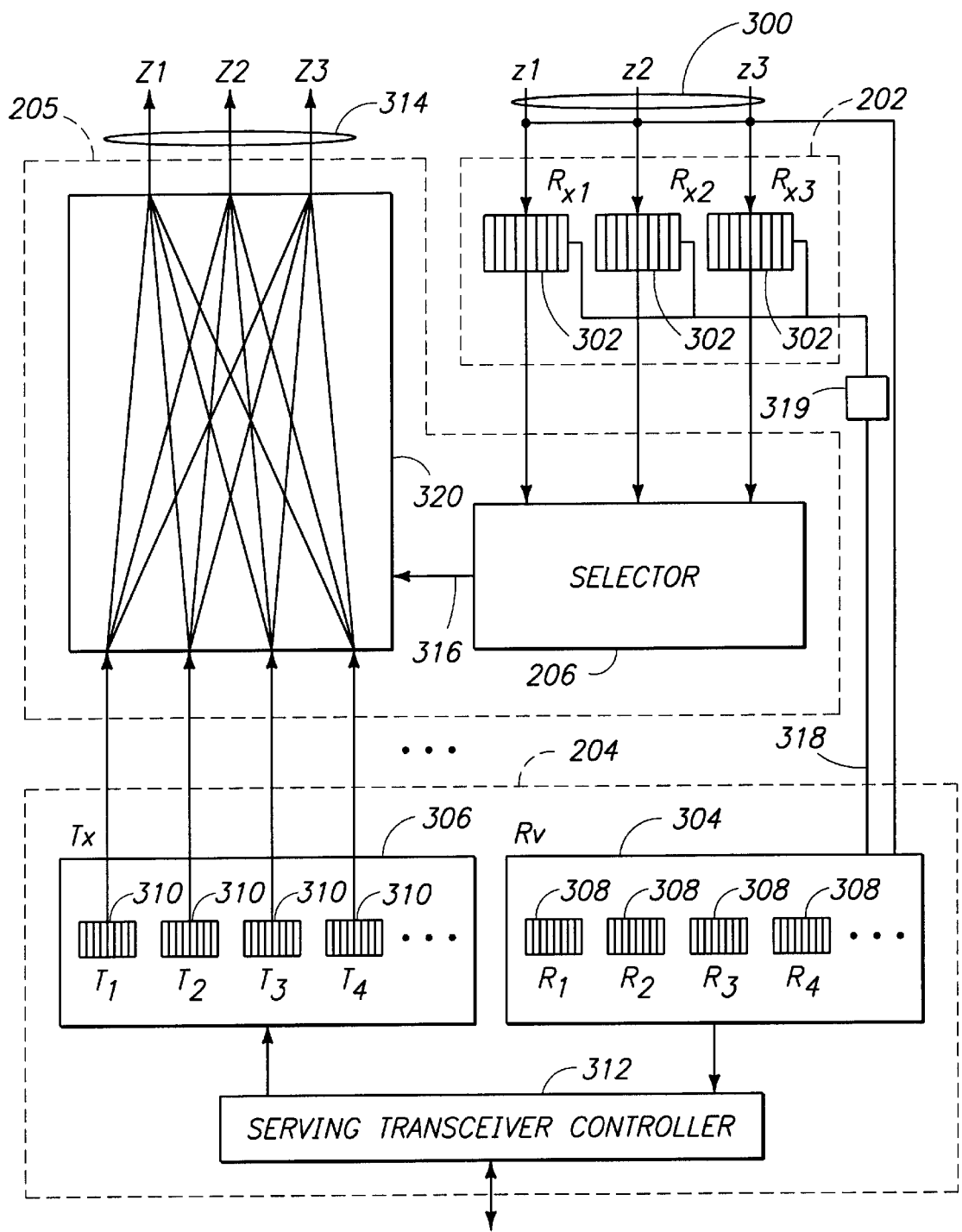
FIG. 3 is a block diagram of one embodiment of the present invention.

FIG. 3 is a block diagram of one embodiment of the present invention illustrating application with a frequency division multiple access (FDMA) and time division multiple access (TDMA) system similar to that employed in GSM. In this application, communication channels are defined by frequency bands and time slots within each band. In this embodiment, scanner 202 comprises a plurality of scanning receivers 302.

In one embodiment, each scanning receiver 302 is associated with a communication zone 104A–108A in the cell 102. For discussion purposes, these zones are indicated on FIG. 3 as $z_1$, $z_2$, and $z_3$. The scanning receivers 302 scan the frequency bands and time slots for each zone to measure a characteristic of signals transmitted from the mobile cellular telephone 112. This information is then provided to a selector 206, which operates in this embodiment as a zone selector, to select the zone for communications with the mobile cellular telephone 112. This is accomplished by the transmitting processor 320, operating here as a zone switch, using the command signal 316 from the selector 206. In one embodiment, the frequencies and time slots scanned by the scanning receivers 302 are synchronously scanned using synchronizing module 319 so that the characteristic of the signal transmitted from the mobile cellular telephone 112 is measured in each zone substantially contemporaneously. However, this need not be the case. In another embodiment, the scanning receivers 302 are not associated with any particular zone, but are instead coupled to beam forming antennae which can service generalized areas 110 within the cell 102.

Serving transceiver 204 comprises a serving receiver 304, a serving transmitter 306, and serving transceiver controller 312. The serving receiver 304 is coupled to the antennae 208, and comprises a plurality of bandpass receivers 308, which receive communications on the selected frequency and time slots. The selection of the receiving frequency and time slot (and hence, the channel) of the bandpass receivers 308 is synchronized with that of the scanning receivers 302 via control signal 318. In one embodiment, the control signal 318 is supplied by a synchronizing module 319. Bandpass transmitters 310 transmit communications to the mobile cellular telephone 112 via the controller 205.

The controller 205 comprises transmitting controller which includes a transmitting processor 320 and selector 206. In one embodiment, the controller 205 selects the proper communications zone for transmissions to the mobile cellular telephone 112 using the command from the selector 206 based upon a signal characteristic measured from the mobile cellular telephone 112. In this embodiment, the transmitting processor 320 operates as a zone switch. This is accomplished by selecting the antennae or antenna 208 servicing the desired communications zone. In another embodiment, the controller 205 provides commands to one or more beam forming antennae based on the measured signal characteristic. In this embodiment, transmitting processor 320 controls the beam forming antennae based upon the measured signal characteristic. This may be accomplished by selecting the amplitude and/or phase relationship of signals emanating from elements of the beam forming antennae, by mechanical steering, or a combination of both techniques.

Figure 4:
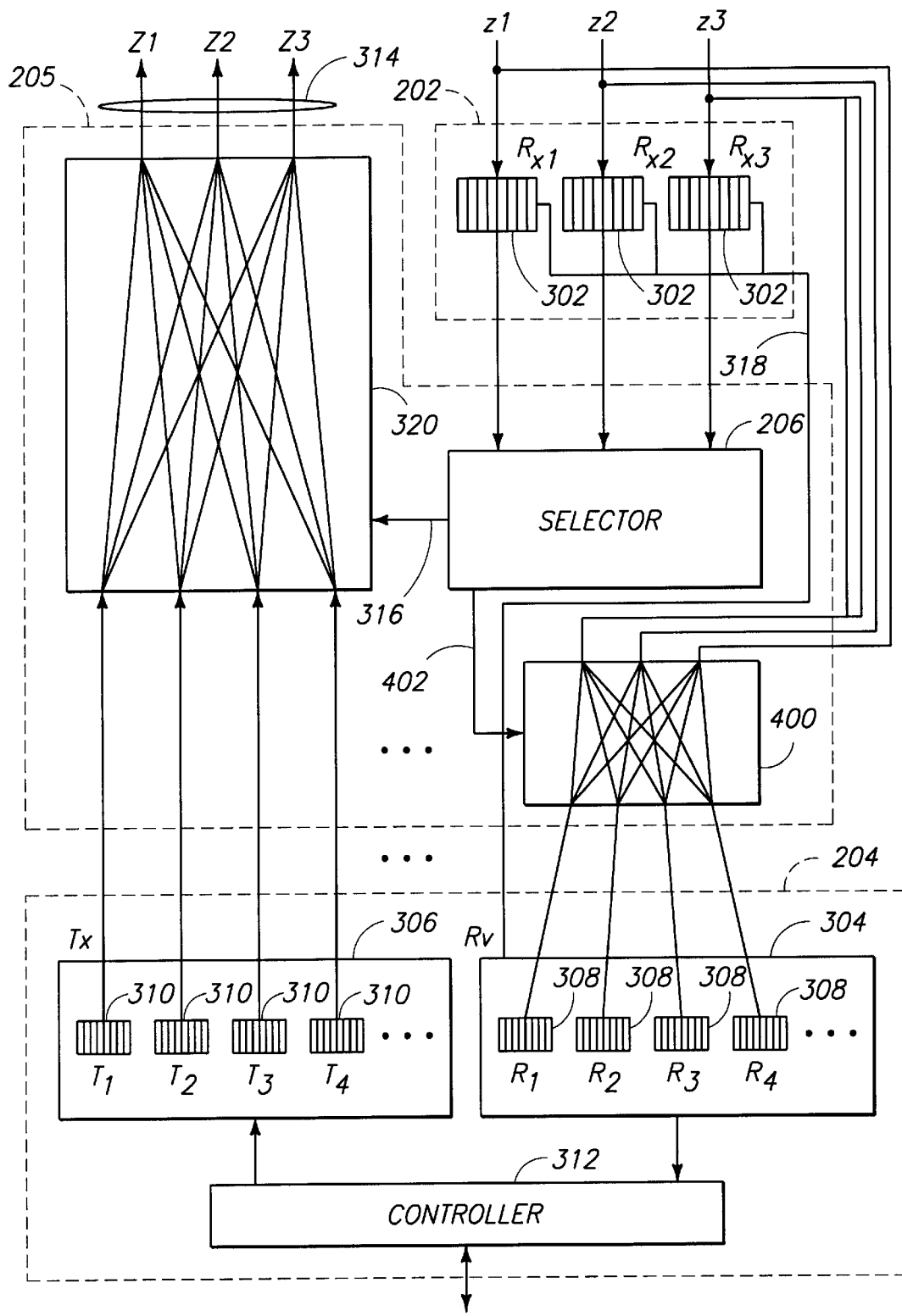
FIG. 4 is a block diagram of a second embodiment of the present invention.

FIG. 4 is a block diagram of an embodiment of the present invention in which the measured signal characteristics of the signal from the mobile cellular telephone 112 are used not only to control transmission communications from the cell to the mobile cellular telephone 112, but also used to control the reception communications for the signal from the mobile cellular telephone 112 as well. As previously described, one advantage of this embodiment is that it permits rejection of unwanted signals. In this embodiment, a receiving controller comprising the selector 206 and a receiving processor 400 is coupled between the antennae 208 and the serving receiver 304. Signals from each antennae 104, 106, and 108 are provided to the receiving processor 400 and provided to the serving receiver 304 based on the signal characteristics measured by the scanning receiver 202. This occurs under the command of the selector 206 via control signal 402. In embodiments using beam switching techniques, the receiving controller selects the antenna or antennae for receiving communications from the mobile cellular telephone 112. In embodiments utilizing beam forming techniques, the receiving controller controls reception of signals from the mobile telephone 112 by providing commands to the beam forming antennae.

Figure 5:
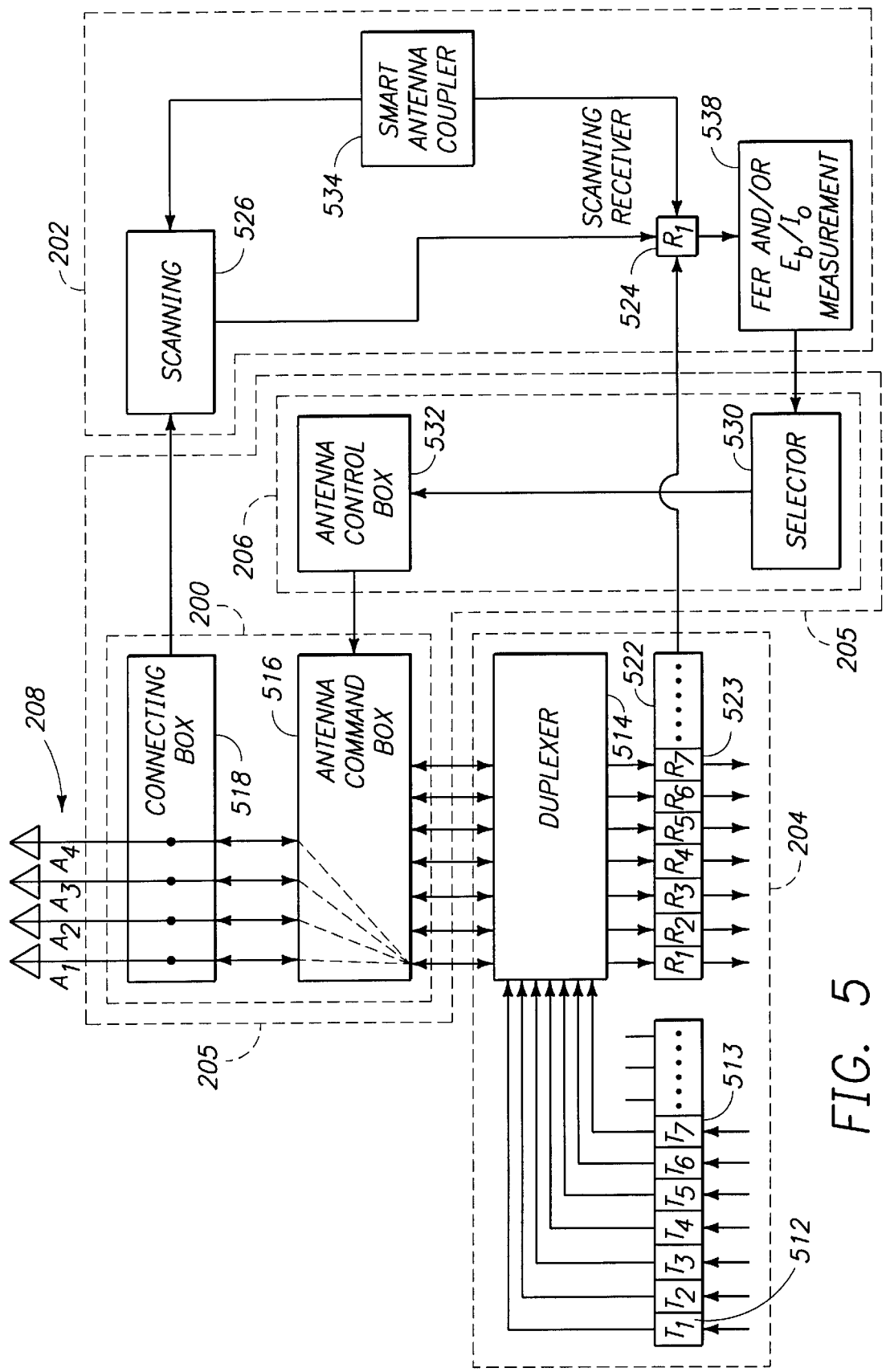
FIG. 5 is a block diagram of a third embodiment of the present invention.

FIG. 5 shows another embodiment of the present invention, illustrating application to a code division multiple access (CDMA) system. In this embodiment, the serving transceiver 204 comprises a CDMA serving transmitter 512, a CDMA serving receiver 522, both coupled to a duplexer 514. The serving transmitter 512 generates baseband signals to transmit on user channels having appropriate PN codes for transmission to the mobile cellular telephone 112. Channel transmitters 513 are indicated as $T_1$, $T_2$, . . . $T_n$, and channel receivers 523 are indicated as $R_1$, $R_2$, . . . $R_n$. The duplexer 514 multiplexes the various user channels on the RF signals.

The controller 205 comprises a selector 206 and an antenna interface module 200 which includes an antenna box 516 coupled to a connecting box 518. The antenna box 516 selects one or more desired antennae 208 for communications with the mobile telephone 112, and feeds the RF signals to the connecting box 518. The connecting box 518 couples the RF signals to the selected antennae 208 for transmission to the mobile telephone 112. As herein described, the antenna box 516 and the connecting box 518 may also be used to select the antennae 208 for receiving signals from the mobile cellular telephone 112.

Signals received through the antennae 208 are also received by the connecting box 518. The connecting box 518 feeds the RF signals to the antenna command box 516. The antenna box 516, in turn, feeds the RF signals to the duplexer 514, which demodulates and demultiplexes the various baseband user channels, and routes the baseband user channels to the serving receiver 522, which comprises a plurality of channel receivers 523.

The scanner 202 comprises a scanning receiver 524 which is selectively coupled to one of the channel receivers 523 one at a time to measure the baseband information of the associated user channel and to select the beam or beams to be formed by any number of the antennae 208. A scanning box 526 is coupled to the scanning receiver 524 and scans the antenna beams to measure a characteristic of the signal transmitted by the mobile cellular telephone 112. In one embodiment, the measured signal characteristic is the FER (frame error rate), or $E_b/I_o$ (energy per bit divided by the interference power per hertz), or both FER and $E_b/I_o$ of each user channel on each antenna 208 or beam. A measurement controller 538 coupled to the scanning receiver 524 uses the measurable characteristics to control the selector 206. The selector 206 selects the desired antenna coverage. Selector 206 is coupled to a control box 532 which translates the desired coverage into antenna 208 commands to select the proper antenna or antennae 208 or beam having the lowest FER, or highest $E_b/I_o$ or both the lowest FER and highest $E_b/I_o$, or other optimal measurable characteristic, for each channel. The smart antenna coupler 534 is responsible for selecting and selectably coupling each of the channel receivers 523 for coupling to the scanning receiver 524 to ensure that all of the antennae 208 or beams are scanned before moving to the next channel receiver 523. This process is repeated periodically for all channels.

In an embodiment of the present invention employing beam switching techniques, antenna interface module 200 selects the proper antenna or antennae 208 by selectively coupling the CDMA serving transceiver 512 to the antennae 208. This may be performed to select an antenna or antennae combination for either transmission or reception of signals to and from the mobile telephone 112. In this case, the selector 206 operates as a zone selector and the antenna interface module 200 operates as a zone switch.

In an embodiment using beam forming techniques alone or in combination with beam switching, the selector 206 and the antenna interface module 200 operate to command the beam forming antennae for transmission and reception in accordance with the measured signal characteristic.

Figure 6A:
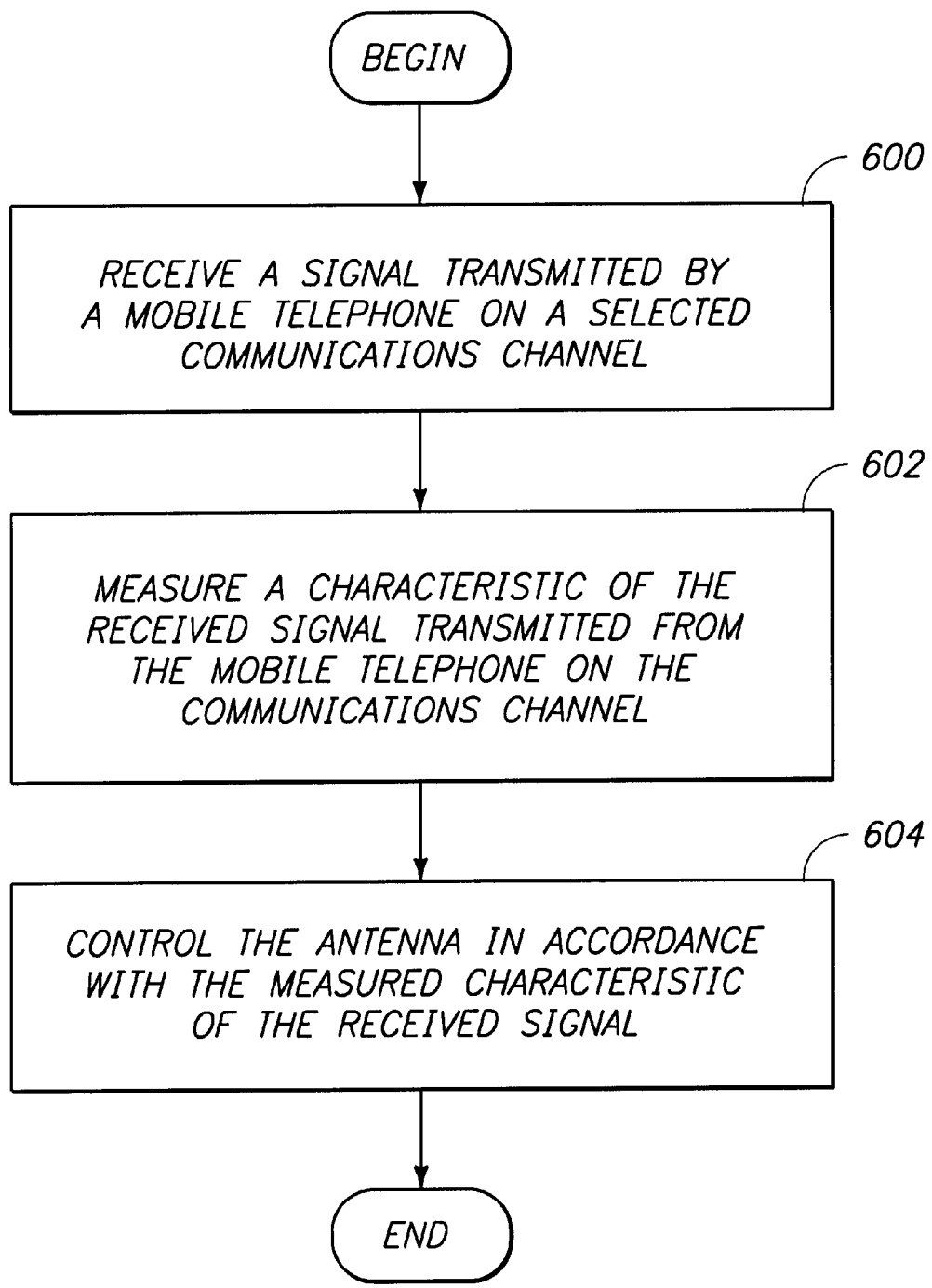
FIGS. 6A–6C are flowcharts illustrating the operation of the present invention.
Figure 6B:
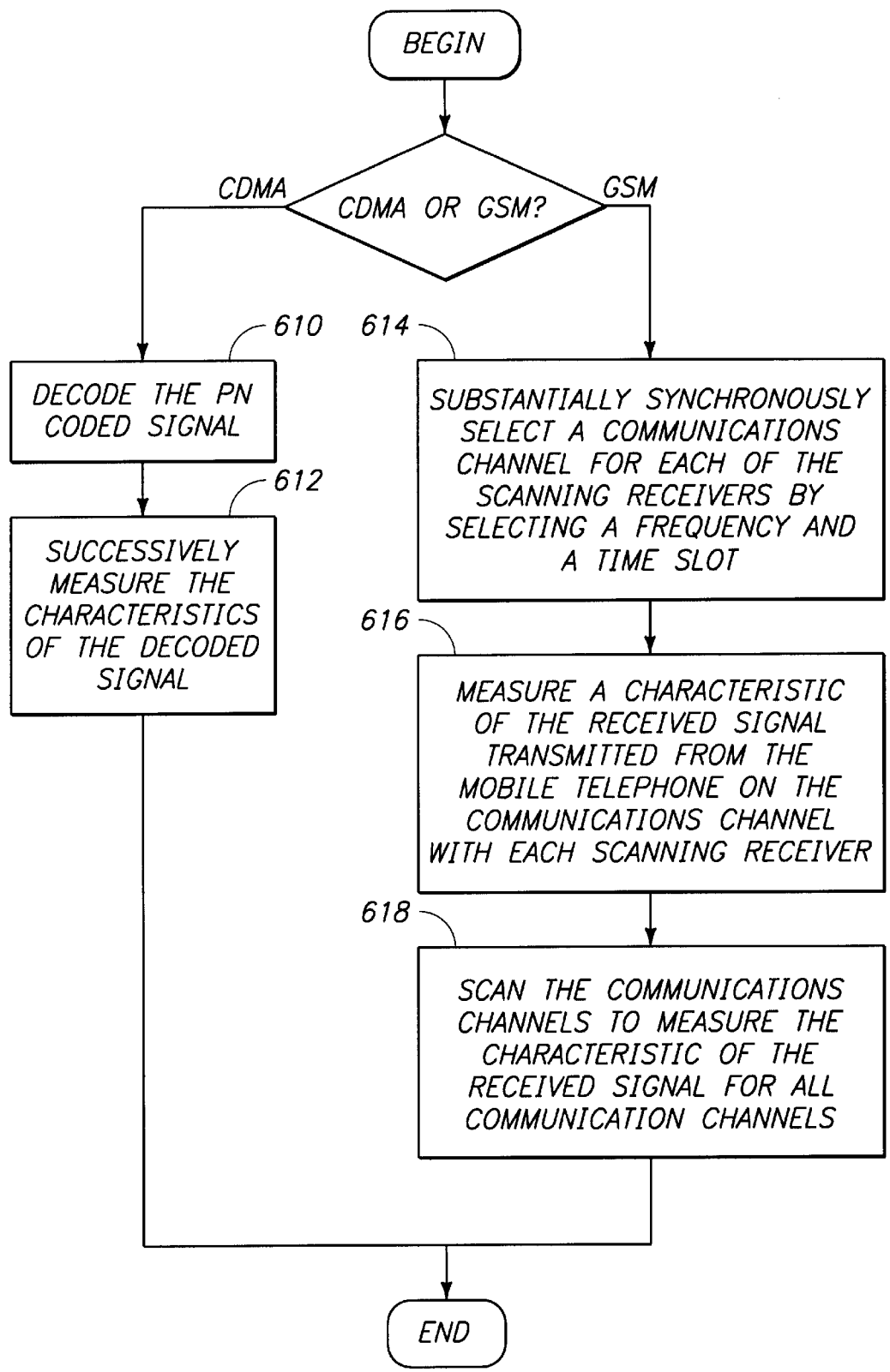
Figure 6C:
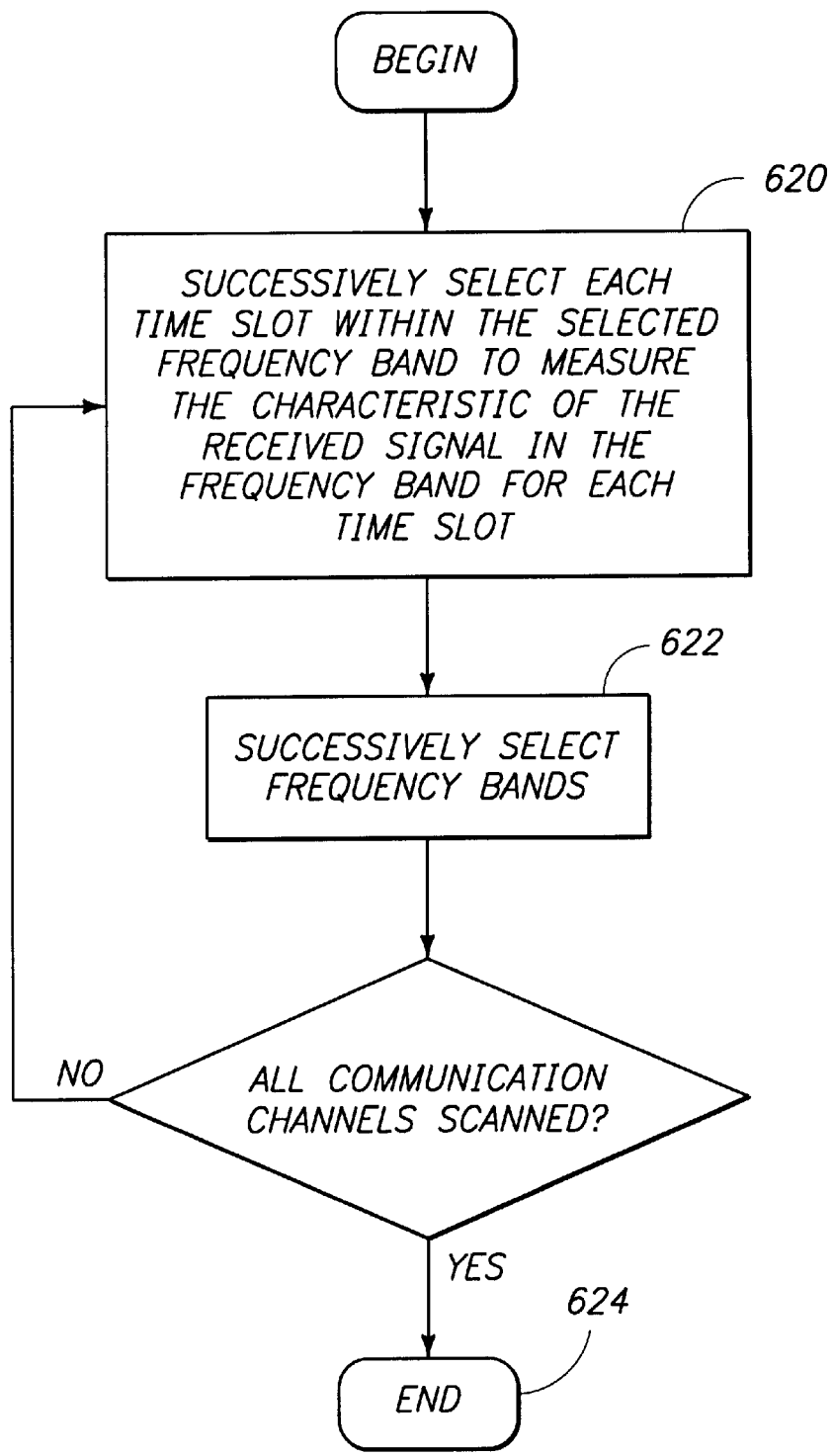

FIGS. 6A–6C are flowcharts further illustrating the operation of the present invention. The process begins when a signal transmitted from the mobile cellular telephone 112 is received on a selected communication channel, as shown in block 600. Next, as shown in block 602, a characteristic of that received signal is measured using an antenna or antennae 208. Then, antennae 208 for communications with the mobile cellular telephone 112 are controlled in accordance with the measured characteristic of the received signal. This is depicted in block 604.

FIG. 6B is a flow chart showing the steps performed to measure a characteristic of the signal received from the mobile cellular telephone 112. If the communications are CDMA coded, the signal received from the mobile cellular telephone is decoded 610, and the characteristics of the decoded signal is measured 612. If the communications are FDMA and TDMA coded, such as is the case with the GSM system, communications channels are selected substantially synchronously for each scanning receiver 302 by selecting a frequency and a time slot. This is illustrated in block 614. Then, as shown in block 616, a characteristic of received signal is measured with each scanning receiver. Finally, the communication channels are scanned to measure the characteristic of the received signal for all communications channels. This is shown in block 618.

FIG. 6C is a flow chart further illustrating the method steps performed in measuring the characteristic of the received signal for all communications channels. First, as depicted in block 620, each time slot within the selected frequency band is successively selected to measure the desired signal characteristic. Then, other frequency bands are successively selected, as shown in block 622. When all communications channels are scanned, the process is completed, as shown in block 624. Of course, the entire process is repeated periodically so that signals from the mobile cellular telephone are periodically received and measured to select the antennae 208.

CONCLUSION

This concludes the description of the preferred embodiment of the invention.

In summary, the present invention describes an apparatus and method for controlling communications between a mobile cellular telephone and a cell of a cellular telephone network. The apparatus comprises a serving transceiver for transmitting and receiving communications between the cell and the mobile cellular telephone, a scanner, coupled to an antenna, for selectably scanning the communication channels to measure a characteristic of the signal transmitted from the mobile telephone, and a controller, coupled to the scanner and the serving transceiver, for commanding the antenna based on the measured signal characteristic.

In one embodiment, antenna control is provided by a switching network which selects an antenna or combination of antennae for communications. In another embodiment, this is accomplished via beam forming techniques. The present invention is suitable for both GSM and CDMA coded communications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claim is:

1. An apparatus for controlling communications between a cellular telephone network operating on a plurality of communication channels and having a cell served by at least one antenna, and a mobile cellular telephone, the apparatus comprising:

a serving transceiver, for transmitting and receiving communications between the cell and the mobile cellular telephone;

a scanner, coupled the antenna, for selectably scanning the communication channels and measuring a characteristic of a signal transmitted from the mobile telephone, the scanner comprising at least one scanning receiver for measuring the signal characteristic;

a controller, coupled to the scanner and the serving transceiver, for commanding the antenna based on the measured signal characteristic;

wherein the cell comprises a plurality of communication zones defined by one or more antennae serving the zone, and wherein the scanner selectably scans the communication zones to measure the characteristic of the signal transmitted from the mobile telephone in the communication zones; and the controller further comprises a zone selector, coupled to the scanner, for selecting the zone for communications between the mobile telephone and the cell based on the measured signal characteristic, and a zone switch, communicatively coupled to the zone selector, the serving transceiver, and the antennae for selectively coupling the antennae to the serving transceiver based on the selected zone;

wherein the serving transceiver comprises:

a serving receiver having a plurality of channel receivers, each selectable coupled to the scanning receiver by an antenna coupler to measure the characteristic and each channel receiver associated with a communication channel;

a serving transmitter having a plurality of channel transmitters, each channel transmitter associated with a communications channel;

a duplexer communicatively coupled to the serving receiver and the serving transmitter, and communicatively coupled to the antennae via the zone switch, the duplexer for selectably coupling the serving receiver and the serving transmitter to the zone switch;

wherein the zone switch selectably couples the antennae to the duplexer to select the communications zone in accordance with the measured characteristic; and wherein the antenna coupler synchronizes a scanning box coupled to the zone switch with the scanning receiver to measure the characteristic in all communication zones before measuring the characteristic in a second communication channel.

2. A method of adaptively controlling communications with a mobile telephone in a cellular telephone network operating on a plurality of communicating channels, the cellular telephone network comprising a cell served by at least one antenna, the method comprising the steps of:

receiving a signal transmitted by the mobile telephone on a selected communication channel;

measuring a characteristic of the received signal transmitted from the mobile telephone on the communications channel;

controlling the antenna in accordance with the measured characteristic of the received signal;

wherein the antenna is a beam forming antenna and controlling step comprises the step of directing a sensitive axis of the beam forming antenna according to the measured signal characteristic;

wherein the signal characteristic is measured substantially synchronously using a plurality of scanning receivers;

wherein the cell wherein further comprises a plurality of antennae and the communication channels are uniguely defined by a frequency band and a time slot, and wherein the step of measuring a characteristic of the received signal transmitted from the mobile telephone on the communicatinos channel comprises the steps of:

substantially synchronously selecting a communications channel for each of the scanning receivers by selecting a frequency band and a time slot;

measuring the characteristic of the received signal transmitted from the mobile telephone on the communications channel with the scanning receiver; and scanning the communications channels to measure the characteristic of the received signal in each channel.

3. An apparatus for controlling communications between a cellular telephone network operating on a plurality of communication channels and having a cell served by at least one antenna and a mobile cellular telephone, the apparatus comprising:

a serving transceiver, for transmitting and receiving communications between the cell and the mobile cellular telephone;

a scanner, coupled to the antenna, for selectably scanning the communication channels and measuring a characteristic of a signal transmitted from the mobile telephone, the scanner comprising at least one scanning receiver for measuring the signal characteristic;

a controller, coupled to the scanner and the serving transceiver, for commanding the antenna based on the measured signal characteristic;

wherein the cell comprises a plurality of communication zones defined by one or more antennae serving the zone;

wherein the scanner selectably scans the communication zones to measure the characteristic of the signal transmitted from the mobile telephone in the communication zones, and the controller further comprises a zone selector, coupled to the scanner, for selecting the zone for communications between the mobile telephone and the cell based on the measured signal characteristic, and a zone switch, communicatively coupled to the zone selector, the serving transceiver, and the antennae for selectively coupling the antennae to the serving transceiver based on the selected zone;

wherein the communication channels are uniquely defined by a frequency band and a time slot, and wherein the scanner comprises a plurality of scanning receivers coupled to the antennae for substantially contemporaneously measuring the characteristic of the signal transmitted by the mobile telephone in each communication zone, and the serving transceiver comprises a serving transmitter and a serving receiver having a plurality of bandpass receivers, each bandpass receiver for receiving communications in the channels within a frequency band, each scanning receiver synchronized to receive signals transmitted in the same time slots as the scanning receivers;

wherein the zone switch comprises a transmitting zone switch coupled between the serving transmitter and antennae for selectively coupling the antennae to the serving transmitter based on the measured signal characteristic; and wherein the antennae comprise at least one beam forming antenna and the transmitting zone switch further comprises a beam forming antenna controller for directing the beam forming antenna in accordance with the measured signal characteristic.

4. An apparatus for controlling communications between a cellular telephone network operating on a plurality of communication channels and having a cell served by at least one antenna and a mobile cellular telephone, the apparatus comprising:

a serving transceiver, for transmitting and receiving communications between the cell and the mobile cellular telephone;

a scanner, coupled to the antenna, for selectably scanning the communication channels and measuring a characteristic of a signal transmitted from the mobile telephone, the scanner comprising at least one scanning receiver for measuring the signal characteristic;

a controller, coupled to the scanner and the serving transceiver, for commanding the antenna based on the measured signal characteristic;

wherein the cell comprises a plurality of communication zones defined by one or more antennae serving the zone, and wherein the scanner selectably scans the communication zones to measure the characteristic of the signal transmitted from the mobile telephone in the communication zones; and the controller further comprises a zone selector, coupled to the scanner, for selecting the zone for communications between the mobile telephone and the cell based on the measured signal characteristic, and a zone switch, communicatively coupled to the zone selector, the serving transceiver, and the antennae for selectively coupling the antennae to the serving transceiver based on the selected zone;

wherein the communication channels are uniquely defined by a frequency band and a time slot, and wherein the scanner comprises a plurality of scanning receivers coupled to the antennae for substantially contemporaneously measuring the characteristic of the signal transmitted by the mobile telephone in each communication zone, and the serving transceiver comprises a serving transmitter and a serving receiver having a plurality of bandpass receivers, each bandpass receiver for receiving communications in the channels within a frequency band, each scanning receiver synchronized to receive signals transmitted in the same time slots as the scanning receivers;

wherein the zone switch comprises a transmitting zone switch coupled between the serving transmitter and antennae for selectively coupling the antennae to the serving transmitter based on the measured signal characteristic; and wherein the zone switch comprises a receiving zone switch coupled between the serving receiver and antennae for selectively coupling the antennae to the serving transmitter based on the measured signal characteristic.

5. The apparatus of claim 4, wherein the antennae comprise at least one beam forming antenna and the transmitting zone switch further comprises a beam forming antenna controller for directing the beam forming antenna in accordance with the measured signal characteristic.

6. A method of adaptively controlling communications with a mobile telephone in a cellular telephone network operating on a plurality of communicating channels, the cellular telephone network comprising a cell served by at least one antenna, the method comprising the steps of:

receiving a signal transmitted by the mobile telephone on a selected communication channel;

measuring a characteristic of the received signal transmitted from the mobile telephone on the communications channel;

controlling the antenna in accordance with the measured characteristic of the received signal;

wherein the antenna is a beam forming antenna and the controlling step comprises the step of directing a sensitive axis of the beam forming antenna according to the measured signal characteristic;

wherein the signal characteristic is measured substantially contemporaneously using a plurality of scanning receivers, each of the plurality of scanning receivers associated with a communication zone;

wherein the communications channels are defined by a plurality of frequency bands and time slots, and the step of measuring the signal characteristic in each zone comprises the steps of:

substantially synchronously selecting a communications channel for each of the scanning receivers by selecting a frequency band and a time slot;

measuring the characteristic of the received signal transmitted from the mobile telephone on the communications channel with each scanning receiver; and scanning the communications channels to measure the characteristic of the received signal in each zone for all communications channels;

and wherein the step of scanning the communications channels comprises the steps of:

successively selecting each time slot within the selected frequency band to measure the characteristic of the received signal in that frequency band for each time slot; and successively selecting frequency bands and repeating the step of selecting each time slot within the selected frequency band to scan all communications channels.

* * * * *

UNITED STATES PATENT AND TRADEMARK OFFICE
CERTIFICATE OF CORRECTION

PATENT NO.   : 6,198,925 B1
DATED        : March 6, 2001
INVENTOR(S)  : William C. Y. Lee It is certified that error appears in the above-identified patent and that said Letters Patent is hereby corrected as shown below:

Title page,
Item [56], References Cited, under U.S. PATENT DOCUMENTS,
5,109,390   4/1992   "Gilhousen" should read -- Gilhousen et al. --
Under OTHER PUBLICATIONS, Vucetic & Kline, "Manahement" should read -- Management --.

Column 9,
Line 20, strike second occurrence of "wherein"; and,
Line 21, "uniguely" should read -- uniquely --.

Signed and Sealed this

Twenty-third Day of July, 2002

Attest:

JAMES E. ROGAN
Attesting Officer    Director of the United States Patent and Trademark Office